US009456019B2

(12) United States Patent
Zhang et al.

(10) Patent No.: US 9,456,019 B2
(45) Date of Patent: Sep. 27, 2016

(54) WEB PAGE LOAD TIME PREDICTION AND SIMULATION

(71) Applicant: Microsoft Corporation, Redmond, WA (US)

(72) Inventors: Ming Zhang, Redmond, WA (US); Yi-Min Wang, Bellevue, WA (US); Albert Greenberg, Seattle, WA (US); Zhichun Li, Evanston, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 820 days.

(21) Appl. No.: 13/707,042

(22) Filed: Dec. 6, 2012

(65) Prior Publication Data

US 2013/0097313 A1   Apr. 18, 2013

Related U.S. Application Data (62) Division of application No. 13/267,254, filed on Oct. 6, 2011, now Pat. No. 8,335,838, which is a division of application No. 12/547,704, filed on Aug. 26, 2009, now Pat. No. 8,078,691.

(51) Int. Cl.
*G06F 15/173* (2006.01)
*H04L 29/08* (2006.01)
*G06F 11/34* (2006.01)

(52) U.S. Cl.
CPC .......... *H04L 67/02* (2013.01); *G06F 11/3419* (2013.01); *G06F 11/3447* (2013.01); *G06F 11/3457* (2013.01); *G06F 2201/875* (2013.01)

(58) Field of Classification Search
CPC ........... G06F 11/3419; G06F 11/3447; G06F 2201/875; H04L 67/02
USPC .................................................. 709/224–226
See application file for complete search history.

(56) References Cited

U.S. PATENT DOCUMENTS 4,380,174 A  4/1983 Tanenbaum
4,395,615 A  7/1983 Tanenbaum (Continued)

OTHER PUBLICATIONS

Bahl et al, "Towards Highly Reliable Enterprise Network Services via Inference of Multi-Level Dependencies", ACM SIGCOMM, Aug. 2007, 12 pgs.

(Continued)

*Primary Examiner* — Vivek Srivastava
*Assistant Examiner* — Normin Abedin
(74) *Attorney, Agent, or Firm* — Kevin Sullivan; Kate Drakos; Micky Minhas (57) ABSTRACT

Embodiments of automated cloud service performance prediction are disclosed. The automated cloud service performance prediction includes extracting one or more dependency relationships for each web object in the webpage. The prediction further includes determining an original performance metric value and original timing information associated with a page loading of a webpage. The prediction also includes simulating a page loading of the webpage based on the adjusted timing information and the dependency relationships to estimate a new performance metric value associated with the simulated page loading of the webpage. The prediction additionally includes comparing the original performance metric value to the new performance metric value to determine whether the adjusted timing information increased or decreased the new performance metric value relative to the original performance metric value.

19 Claims, 7 Drawing Sheets

(56) References Cited

U.S. PATENT DOCUMENTS

| | | | |
|---|---|---|---|
| 4,408,115 | A | 10/1983 | Tanenbaum |
| 4,421,969 | A | 12/1983 | Tanenbaum |
| 6,473,794 | B1 | 10/2002 | Guheen et al. |
| 6,519,571 | B1 | 2/2003 | Guheen et al. |
| 6,536,037 | B1 | 3/2003 | Guheen et al. |
| 6,601,020 | B1 | 7/2003 | Myers |
| 6,615,166 | B1 | 9/2003 | Guheen et al. |
| 6,671,818 | B1 | 12/2003 | Mikurak |
| 6,775,644 | B2 | 8/2004 | Myers |
| 7,124,101 | B1 | 10/2006 | Mikurak |
| 7,149,698 | B2 | 12/2006 | Guheen et al. |
| 7,165,041 | B1 | 1/2007 | Guheen et al. |
| 7,388,839 | B2 | 6/2008 | Chafle et al. |
| 7,475,067 | B2 | 1/2009 | Clary et al. |
| 7,558,771 | B2 | 7/2009 | Barajas et al. |
| 7,703,079 | B1 | 4/2010 | Burrows et al. |
| 7,809,601 | B2 | 10/2010 | Shaya et al. |
| 7,853,244 | B1 | 12/2010 | Brisebois |
| 7,853,535 | B2 | 12/2010 | Colella |
| 7,904,518 | B2 | 3/2011 | Marino et al. |
| 7,921,205 | B2 | 4/2011 | Shen et al. |
| 2005/0262104 | A1 | 11/2005 | Robertson et al. |
| 2006/0253850 | A1* | 11/2006 | Bruno et al. .................. 717/173 |
| 2007/0016573 | A1 | 1/2007 | Nanavati et al. |
| 2007/0083649 | A1 | 4/2007 | Zuzga et al. |
| 2007/0136788 | A1 | 6/2007 | Monahan et al. |
| 2007/0294399 | A1 | 12/2007 | Grossner et al. |
| 2009/0063621 | A1* | 3/2009 | Cheng et al. ................. 709/203 |
| 2009/0094137 | A1* | 4/2009 | Toppenberg et al. ........... 705/27 |
| 2011/0054878 | A1 | 3/2011 | Zhang et al. |
| 2012/0030338 | A1 | 2/2012 | Zhang et al. |

OTHER PUBLICATIONS

Brown et al, "An Active Approach to Characterizing Dynamic Dependencies for Problem Determination in a Distributed Environment", IFIP/IEEE Intl Symposium on Integrated Network Management, May 2001, 14 pgs.

Cardwell et al, "Modeling TCP Latency", IEEE INFOCOM, Mar. 2000, 10 pgs.

Chen et al, "Automating Network Application Dependency Discovery: Experiences, Limitations and New Solutions", OSDI, 8th USENIX Symposium on Operating Systems Design and Implementation, Dec. 2008, 14 pgs.

Chen et al, "Link Gradients: Predicting the Impact of Network Latency on Multitier Applications", IEEE INFOCOM, Mar. 2009, 9 pgs.

Hu et al, "Improving TCP Startup Performance Using Active Measurements: Algorithm and Evaluation", Proc 11th IEEE Intl Conf on Network Protocols, Nov. 2003, 12 pgs.

"iMacros for Firefox", retrieved on Oct. 13, 2009 at http://www.iopus.com/imacros/home/fx/welcome.htm, 3 pgs.

Kandula et al, "What's Going on? Learning Communication Rules in Edge Networks", ACM SIGCOMM, Aug 2008, pp. 87-98.

"Keynote Internet Testing Environment", retrieved on Oct. 13, 2009 at http://kite.keynote.com, 1 pg.

Kiciman et al, "AjaxScope: A Platform for Remotely Monitoring the Client-Side Behavior of Web 2.0 Applications", ACM SOSP, Oct. 2007, 14 pgs.

Kohavi et al, "Practical Guide to Controlled Experiments on the Web: Listen to Your Customers not to the HiPPO", ACM KDD, Aug. 2007, 9 pgs.

Litoiu, "Migrating to Web Services—Latency and Scalability", Proceedings of the Fourth International Workshop on Web Site Evolution, WSE 2002, Oct. 2002, 8 pages.

Nahum et al, "The Effects of Wide-Area Conditions on WWW Server Performance", ACM Slgmetrics, Jun. 2001, pp. 257-267.

Office Action for U.S. Appl. No. 13/267,254, mailed on Mar. 13, 2012, Ming Zhang, "Web Page Load Time Prediction and Simulation", 7 pgs.

Olshefski et al, "Inferring Client Response Time at the Web Server", ACM Sigmetrics, Jun. 2002, 12 pgs.

Park et al., "CoDNS: Improving DNS Performance and Reliability via Cooperative Lookups", Proc 6th Conf on Symposium on Operating Systems Design and Implementation, USENIX OSDI, Dec. 2004, vol. 6, 16 pgs.

Paxson, "Bro: A System for Detecting Network Intruders in Real-Time", Computer Networks, 31, Dec. 23-24, 1999, 2435-2463, 22 pgs.

Rajamony et al, "Measuring Client-Perceived Response Times on the WWW", Usenix Symposium on Internet Technologies and Systems, Mar. 2001, 12 pgs.

"Selenium Web Application Testing System", retrieved on Oct. 13, 2009 at http://seleniumhq.org, 2 pgs.

Shah et al, "Keyboards and Covert Channels", USENIX Security, Jul.-Aug. 2006, pp. 59-75.

Tariq et al, "Answering What if Deployment and Configuration Questions with Wise", ACM SIGCOMM, Aug. 2008, pp. 99-110.

Tian, et al., "A Concept for QoS Integration in Web Services", Proceedings of the Fourth International Conference on Web Information Systems Engineering Workshops, WISEW 2003, Dec. 2003, 7 pages.

Veal et al, "New Methods for Passive Estimation of TCP Round-Trip Times", PAM Passive and Active Network Measurement, 6th International Workshop, Mar. 2005, 14 pgs.

"Watir, Web Applicatioon Testing in Ruby", retrieved on Oct. 13, 2009 at http://watir.com, 4 pgs.

Wikipedia, "Cloud Computing", retrieved on Jun. 25, 2009 at http://en.wikipedia.org/wiki/Cloud computing, Wikipedia, Jun. 24, 2009, pp. 1-14.

Wischik, "Short Messages", Journal Philosophical Transactions of the Royal Society, 366 (1872), University of Leicester MSc seminar, Jan. 2008, 11 pgs.

* cited by examiner

WEB PAGE LOAD TIME PREDICTION AND SIMULATION

CROSS REFERENCE TO RELATED APPLICATIONS

This patent application is a divisional application of, and claims priority to, co-pending, commonly-owned U.S. patent application Ser. No. 13/267,254 entitled "WEB PAGE LOAD TIME PREDICTION AND SIMULATION", and filed on Oct. 6, 2011, which is a divisional application of U.S. Pat. No. 8,078,691 issued on Dec. 13, 2011, entitled "WEB PAGE LOAD TIME PREDICTION AND SIMULATION", these applications are incorporated herein in their entirety by reference.

BACKGROUND

"Cloud computing" refers to the access of computing resources and data via a network infrastructure, such as the Internet. Online service providers may offer a wide range of services that may be hosted in the cloud; and such services may include search, maps, email, and outsourced enterprise applications. Further, online service providers may strive to achieve high levels of end-to-end cloud service performance to sustain and grow their user base. The performance of cloud services has direct impact on user satisfaction. For example, poor end-to-end response times, e.g., long page load times (PLTs), may result in low service usage, which in turn may undermine service income.

In order to achieve high levels of end-to-end performance, online service providers may implement performance boosting changes. For example, performance boosting changes may include improvements to the client-side rendering capability of web browsers, improved backend server-side processing capabilities, and the reduction in the domain name system (DNS) resolution time and/or network round-trip time (RTT). However, cloud computing service implementations are often complex, spanning components on end-system clients, back-end servers, as well as network paths. Thus, performance boosting changes may vary greatly in feasibility, cost and profit generation.

SUMMARY

Described herein are performance prediction techniques for automatically predicting the impact of various optimizations on the performance of cloud services, and systems for implementing such techniques.

The cloud services may include, but are not limited to, web searches, social networking, web-based email, online retailing, online maps, personal health information portals, hosted enterprise applications, and the like. The cloud services are often rich in features and functionally complex. For instance, a sample "driving directions" webpage provided by Yahoo! Maps was examined and found to comprise approximately 100 web objects and several hundred KB of JavaScript code. The web objects may be retrieved from multiple data centers (DCs) and content distribution networks (CDNs). These dispersed web objects may meet only at a client device, where they may be assembled by a browser to form a complete webpage. Moreover, the web objects may have a plethora of dependencies, which means that many web objects cannot be downloaded until some other web objects are available. For instance, an image download may have to wait for a JavaScript® to execute in an instance where the image download is requested by the download JavaScript. Accordingly, optimizations of the cloud services may include, but are not limited to, modifications of content distribution networks, improvements to client-side rendering capability of web browsers, improved backend server-side processing capabilities, and reductions in DNS resolution time and/or network round-trip time (RTT).

Thus, because of the complexity of the cloud services, variability of the interdependencies between web objects, as well as the different combinations of potential optimizations, it is often difficult to understand and predict the impact of various optimizations on the performance of cloud services. However, techniques described herein, and the implementing systems, may enable performance predictions via one or more inferences of dependencies between web objects, and the simulated download of web objects in a webpage via a web browser. The simulation may further include the simulated modification of parameters that affect cloud service performance. Such parameters may include, but are not limited to, round-trip time (RTT), network processing time (e.g., DNS lookup time, TCP handshake time, or data transfer time), client execution time, and server processing time. In this way, the techniques, and the implementing systems, described herein may enable the assessment of cloud service performance under a wide range of hypothetical scenarios. Thus, the techniques and systems described herein may enable the prediction of parameter settings that provide optimal cloud service performance, i.e., shortest page load time (PLT).

In at least one embodiment, the automated cloud service performance prediction includes extracting a parental dependency graph (PDG) for a webpage. The PDG encapsulates one or more dependency relationships for each web object in the webpage. The prediction further includes determining an original page load time (PLT) and original timing information of a webpage. The prediction also includes simulating a page loading of the webpage based on adjusted timing information of each web object and the PDG to estimate a new PLT of the webpage. The prediction additionally includes comparing the original PLT of the webpage to the new PLT of the webpage to determine whether the adjusted timing information increased or decreased the new PLT of the webpage. Other embodiments will become more apparent from the following detailed description when taken in conjunction with the accompanying drawings.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to the implementation of automated performance prediction for cloud services. Cloud service implementations are often complex, spanning components on end system clients, backend servers, as well as a variety of network paths. In various instances, the performance of the cloud services may be improved, i.e., page load time (PLT) minimized, via the modification of parameters that affect cloud service performance. Such parameters may include, but are not limited to, round-trip time (RTT), network processing time (e.g., DNS lookup time, TCP handshake time, or data transfer time), client execution time, and server processing time. However, it is often difficult to understand and predict the true effect of parameter modifications on the performance of clouds. This difficulty may be attributed to the complexity of the cloud service implementations, variability of the interdependencies between web objects that access the cloud services, as well as the different options for optimizing access to cloud services. In fact, manual efforts to assess the impact of parameter modifications on the performance of cloud service can, in practice, be overly burdensome and error prone.

In various embodiments, the automated performance prediction for cloud services may enable the simulated modification of parameters that affect cloud service performance. Thus, the techniques, and the implementing systems, described herein may enable the prediction of parameter settings that provide optimal cloud service performance, i.e., shortest PLT. Therefore, the use of automated performance prediction for cloud services may improve PLTs of cloud services without the error prone and/or time consuming manual trial-and-error parameter modifications and performance assessments.

Further, the data generated by the automated performance predictions may be used by online service providers to implement parameter changes that improve the performance of cloud services without the addition of data centers, servers, switches, and/or other hardware infrastructure. Thus, user satisfaction with the performance of the cloud services may be maximized at a minimal cost. Various examples for implementing automated performance prediction for cloud services in accordance with the embodiments are described below with reference to FIGS. 1-7.

Example Architecture

Figure 1:
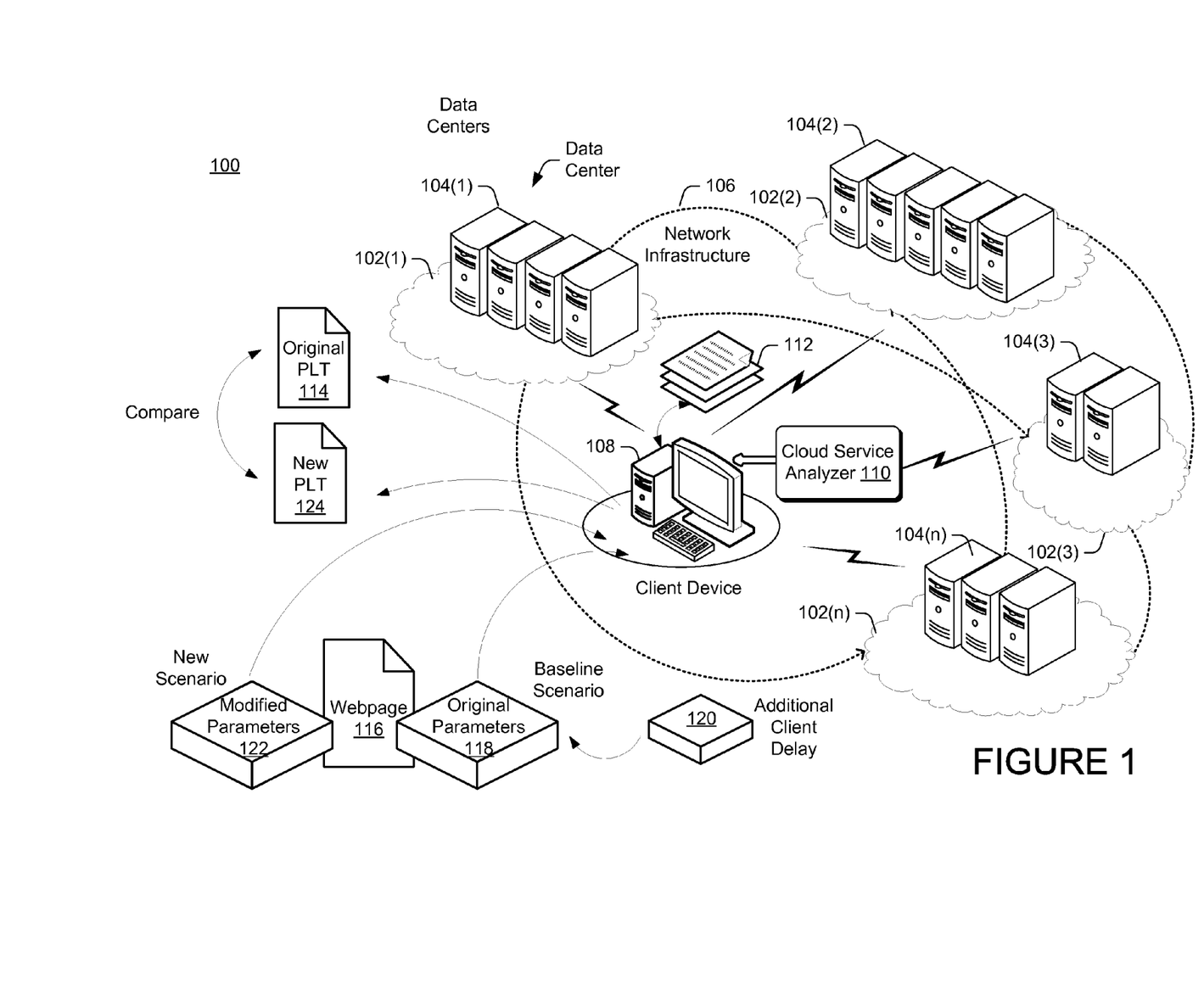
FIG. 1 is a block diagram that illustrates an example architecture that implements automated performance prediction for cloud services, in accordance with various embodiments.

FIG. 1 is a block diagram that illustrates an example architecture 100 that implements automated performance prediction for cloud services. In particular, this architecture 100 implements automated performance prediction to help improve the end-to-end response times of the cloud services.

The example architecture 100 may be implemented on a "computing cloud", which may include a plurality of data centers, such as the data centers 102(1)-102(n). As shown in FIG. 1, the data center 102(1) may include one or more servers 104(1), the data center 102(2) may include one or more servers 104(2), the data center 102(3) may include one or more servers 104(3), and the data center 102(n) may include one or more servers 104(n).

The data centers 102(1)-102(n) may provide computing resource and data storage/retrieval capabilities. As used herein, computing resources may refer to any hardware and/or software that are used to process input data to generate output data, such as by the execution of algorithms, programs, and/or applications. Each of the respective data centers may be further connected to other data centers via the network infrastructure 106, such as the Internet. Moreover, the data centers 102(1)-102(n) may be further connected to one or more clients, such as a client 108, via the network infrastructure 106.

The data center 102(1)-102(n) may use their computing resources and data storage/retrieval capabilities to provide cloud services. These cloud services may include, but are not limited to, web searches, social networking, web-based email, online retailing, online maps, and the like. Cloud services may be delivered to users in form of web pages that can be rendered by browsers. Sophisticated web pages may contain numerous static and dynamic web objects arranged hierarchically. To load a typical webpage, a browser may first download a main HTML object that defines the structure of the webpage. The browser may then download a Cascading Style Sheets (CSS) object that describes the presentation of the webpage. The main HTML object may be embedded with many JavaScript objects that are executed locally to interact with a user. As the webpage is being rendered, an HTML or a JavaScript object of the webpage may request additional objects, such as images and additional JavaScript objects. This process may continue recursively until all relevant objects are downloaded.

A cloud service analyzer 110 may be implemented on a client device 108. The client device 108 may be a computing device that is capable of receiving, processing, and output data. For example, but not as a limitation, the client device 108 may be a desktop computer, a portable computer, a game console, a smart phone, or the like. The cloud service analyzer 110 may predict the impact of various optimizations on user-perceived performance of cloud services.

In operation, the cloud service analyzer 110 may derive a parental dependency graph (PDG) 112 for a particular webpage. As further described below, the PDG 112 may represent the various web object dependencies that may be present in a webpage. The dependencies between web objects may be caused by a number of reasons. The common ones may include, but is not limited to: (1) the embedded web objects in an HTML page depend on the HTML page; (2) since at least some web objects are dynamically requested during JavaScript execution, these web objects may depend on the corresponding JavaScript; (3) the download of an external CSS or JavaScript object may block the download of other types of web objects in the same HTML page; and (4) web object downloads may depend on certain events in a JavaScript or the browser.

The cloud service analyzer 110 may further obtain a total page load time (PLT) 114 of the webpage 116 by performing a page load in a baseline scenario. During the page load, the cloud service analyzer 110 may also obtain parameters, i.e., timing information 118, related to the download of each web object in the webpage 116. The timing information 118 may include client delay, network delay, and server delay that occur during the page load of the webpage. For example, the client delay may be due to various browser activities such as page rendering and JavaScript execution. The network delay may be due to DNS lookup time, transmission control protocol (TCP) handshake time, and data transfer time. Both TCP handshake time and data transfer time may be influenced by network path conditions such as RTT and packet loss. Moreover, the server delay may be incurred by various server processing tasks such as retrieving static content and generating dynamic content.

Having obtained the timing information 118 for each web object in the webpage 116 for the baseline scenario, the cloud service analyzer 110 may add additional client delay 120 for each web object to the timing information 118. In at least one embodiment, the cloud service analyzer 110 may infer the additional client delay by combining the timing information 118 with the PDG 112 of the webpage 116.

Subsequently, the cloud service analyzer 110 may receive a new scenario that includes modified parameters, i.e., modified timing information 122. For example, but not as a limitation, the cloud service analyzer 110 may receive modifications to RTT, modifications to network processing time, modifications to client execution time, modifications to server processing time, and/or the like. The cloud service analyzer 110 may simulate the page loading of all web objects of the webpage 116 based on the modified time information 122 and the PDG 112 to estimate the second PLT 124 of the webpage. Subsequently, the cloud service analyzer 110 may compare the second PLT 124 of the webpage to the first PLT 114 of the webpage to determine whether the load time has been improved via the parameters modifications (e.g., whether a shorter load time is achieved). Thus, by repeating the modifications of the parameters and the comparisons, the cloud service analyzer 110 may test a plurality of new scenarios to derive improved parameter settings that minimize PLT.

Example Components

Figure 2:
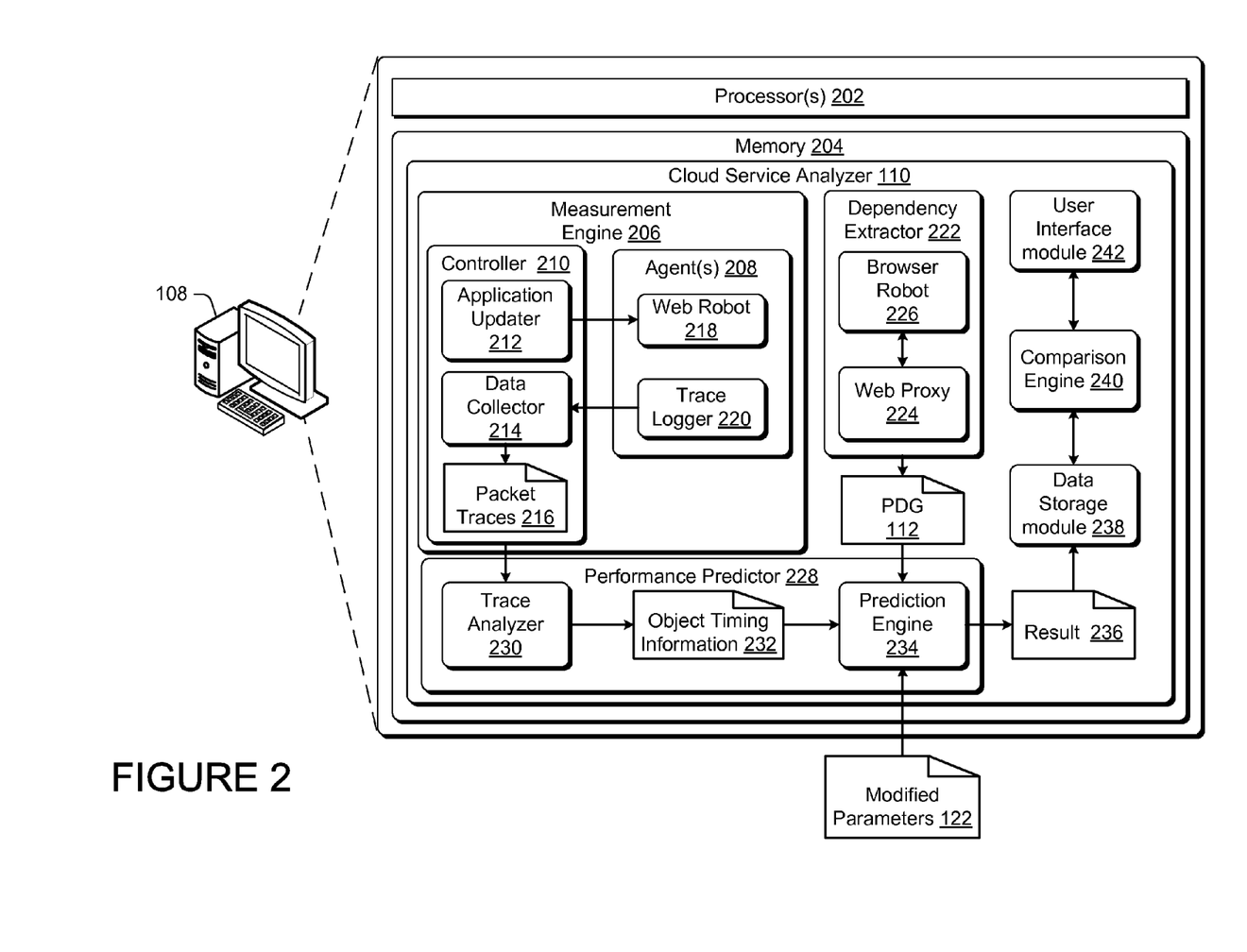
FIG. 2 is a block diagram that illustrates selected components for automatically predicting the performance of cloud services, in accordance with various embodiments.

FIG. 2 is a block diagram that illustrates selected components for performing automated performance prediction for cloud services. The selected components may be implemented on a client device 108 (FIG. 1). The client device 108 may include one or more processors 202 and memory 204.

The memory 204 may include volatile and/or nonvolatile memory, removable and/or non-removable media implemented in any method or technology for storage of information, such as computer-readable instructions, data structures, program modules or other data. Such memory may include, but is not limited to, random accessory memory (RAM), read-only memory (ROM), electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and is accessible by a computer system. Further, the components may be in the form of routines, programs, objects, and data structures that cause the performance of particular tasks or implement particular abstract data types.

The memory 204 may store components. The components, or modules, may include routines, programs instructions, objects, and/or data structures that perform particular tasks or implement particular abstract data types. The selected components may include a measurement engine 206, a dependency extractor 222, and a performance predictor 228, a comparison engine 212, a data storage module 238, a comparison engine 240, and a user interface module 242. The various components may be part of the cloud server analyzer 110 (FIG. 1).

Measurement Engine

The measurement engine 206 may collect packet traces 216 that enable the cloud service analyzer 102 to determine the page load times (PLTs) of web pages, as well as determine DNS, TCP handshake, and HTTP object information. The measurement engine 206 may include a set of measurement agents 208 located at different network nodes and a central controller 210. The controller 210 may use an application updater 212 to upgrade the script snippets that simulate user interaction with particular websites and workload (e.g., the input to cloud services). Moreover, the controller 210 may store packet traces 216 collected from the different agents 208 by a data collector 214.

The measurement engine 206 may run an automated web robot 218 that drives a full-featured web browser. The web robot 218 may be used to simulate user inputs and to request web pages. Further, the web robot 218 may call a trace logger 220 to log the packet traces 216 multiple times so that the measurement engine 206 may recover the distributional properties of a particular page loading process. In various embodiments, the web robot 218 may also take control of a web browser via a browser plug-in. The web robot 218 may include a script library that enables the web robot to control browser related functions. These functions may include cache control, browser parameter adjustment, as well as user input simulation.

Dependency Extractor

The dependency extractor 222 may include an algorithm to infer dependencies between web objects by perturbing the download times of individual web objects. The algorithm may leverage the fact that the delay of an individual web object will be propagated to all other dependent web objects. Accordingly, this time perturbation may be systematically applied to discover web object dependencies.

Modern web pages may contain many types of web objects such as HTML, JavaScript, CSS, and images. These embedded web objects may be downloaded recursively instead of all at once. For instance, the main HTML may contain a JavaScript whose execution will lead to additional downloads of HTML and image objects. Thus, a web object may be classified as being dependent on another if the former cannot be downloaded until the latter is available. The dependencies between web objects can be caused by a number of reasons. The common reasons may include, but are not limited to: (1) the embedded web objects in an HTML page may depend on the HTML page; (2) since web objects are dynamically requested during JavaScript execution, these web objects may depend on the corresponding JavaScript; (3) the download of an external CSS or JavaScript object may block the download of other types of objects in the same HTML page; and (4) web object downloads may depend on certain events in a JavaScript or the browser. For instance, a JavaScript may download image B only after image A is loaded. In other words, given an image A, the dependent web objects of image A usually cannot be requested before image A is completely downloaded.

However, there are exceptions to the common dependencies between objects, and therefore the following may provide context for the functionality of the dependency extractor 222. In some instances, a browser may render an HTML page in a streamlined fashion, in which the HTML page may be partially displayed before the downloading finishes. For instance, if an HTML page has an embedded image with tag <img>, the image may be downloaded and displayed in parallel with the downloading of the HTML page. In fact, the image download may start once the tag <img> (identified by a byte offset in the HTML page) has been parsed. Thus, web objects that can be processed in a streamlined fashion may be defined as stream objects, and all HTML objects may be stream objects. For instance, given a stream object A, the notation dependent offset$_A$ (img) may be used to denote the byte offset of <img> in the stream object A. In one example, browsers that exhibit streamlined processing behavior may include the Internet Explorer® browser produced by the Microsoft® Corporation of Redmond, Wash.

Thus, in order to distinguish stream objects from non-stream objects, a different kind of notation may be used to denote dependencies between non-stream objects. In various embodiments, given a non-stream object X the notation descendant (X) may be used to denote the set of objects that depend on the non-stream object X. Conversely, the notation ancestor (X) may be used to denote the set of web objects that the non-stream object X depends on. Thus, by definition, the non-stream object X cannot be requested until all the objects in ancestor (X) are available.

Among the objects in ancestor (X), the object whose loading immediately precedes the loading of the non-stream object X may be denoted as the last parent of the non-stream object X Thus, if such a preceding web object is designated as object Y, the available-time of the object Y may be expressed as when the dependency offset$_Y$ (X) has been loaded. In embodiments where object Y is a non-stream object, the available-time of the object Y may be when the object Y is completed loaded. As further described below, the available-time of the object Y may be used to estimate the start time of the non-stream object X's download and predict the page load time (PLT) of a webpage. Further, while the non-stream object X has only one last parent, the last parent of the non-stream object X may change across different page loads due to variations in the available-time of its ancestors. Accordingly, parent (X) may be used denote the object in ancestor (X) that may be the last parent of the non-stream object X.

Therefore, as further described below, given a webpage, a parental dependency graph (PDG) 112 (FIG. 1) may be used to encapsulate the parental relationships between web objects in the webpage. For example, a PDG=(V,E) may be a directed acyclic graph (DAG) that includes a set of nodes and directed links, where each node is a web object. Moreover, each link Y→X means Y is a parent of X. Thus, the work performed by the dependency extractor 222 may be explained based on the above described notations and relationships.

The dependency extractor 222 may extract the dependencies of a webpage by perturbing the download of individual web objects. The dependency extractor 222 may leverage the fact that the delay of an individual web object may be propagated to all other dependent web objects. Accordingly, the dependency extractor 222 may extract the stream parent of a web object and the corresponding dependent offset. For example, suppose a web object X has a stream parent Y, to discover this parental relationship, the available time of Offset$_Y$ (X) should be earlier than all of the other parents of the web object X in a particular page load. Thus, the dependency extractor 222 may control the download of not only each non-stream parent of the web object X as a whole, but also each partial download of each stream parent of the web object X.

In order to extract dependencies of the web objects of a web page, the dependency extractor 222 may discover ancestors and descendants for the web objects. In various embodiments, the dependency extractor 222 may use a web proxy 224 to delay web object downloads of a webpage and extract the list of web objects in the webpage by obtaining their corresponding Universal Resource Identifiers (URIs). Further, the dependency extractor 222 may discover the descendants of each web object using an iterative process. In various embodiments, the dependency extractor 222 may reload the page and delay the download of a web object, such as web object X, for τ seconds in each round of the iterative process. In each round, the web object X may be a web object that has not been processed, and T may be greater than the normal loading time of the web object X. The descendants of the web object X may be web objects whose download is delayed together with the web object X The iterative process may be repeated until the descendants of all the web objects are discovered. During the iterative process, the dependency extractor 222 may use a browser robot 226 to reload pages. In such embodiments, the operation of the dependency extractor may be based on two assumptions: (1) the dependencies of a webpage do not change during the discovery process; and (2) introduced delays will not change the dependencies in the webpage.

The dependency extractor 222 may also extract non-stream parents of each web object during the process of extracting dependencies of the web objects. In various embodiments, given a non-stream web object X and its web object Z, non-stream web object X may be the parent of descendant web object Z if and only if there does not exist a web object Y that is also the descendant of web object X and the ancestor of descendant web object Z. On the other hand, if such web object Y exists, the available-time of the web object Y may be later than that of the non-stream web object X This is because the web object Y cannot be downloaded until the non-stream web object X is available, which implies the web object X cannot be the parent of the web object Z. However, if the web object Y does not exist, there may be scenarios in which the non-stream web object X is delayed until all of the other ancestors of the web object Z are available. This may be possible because none of the other ancestors of the web object Z depend on the web object X, which may imply that the non-stream web object X may indeed be the parent of the descendant web object Z. Based on these observations, the dependency extractor 222 may use the following algorithm (shown in pseudo code) to take a set of web objects and the set of descendants of each web object as input and compute the parent set of each web object:

```
ExtractNonStreamParent(Object, Descendant)
For X in Object
    For Z in Descendant (X)
        IsParent = True
        For Y in Descendant (X)
            If (Z in Descendant (Y) )
                IsParent = False
                Break
            EndIf
        EndFor
        If (Isparent) add X to Parent (Z)
    EndFor
EndFor
```

Figure 3:
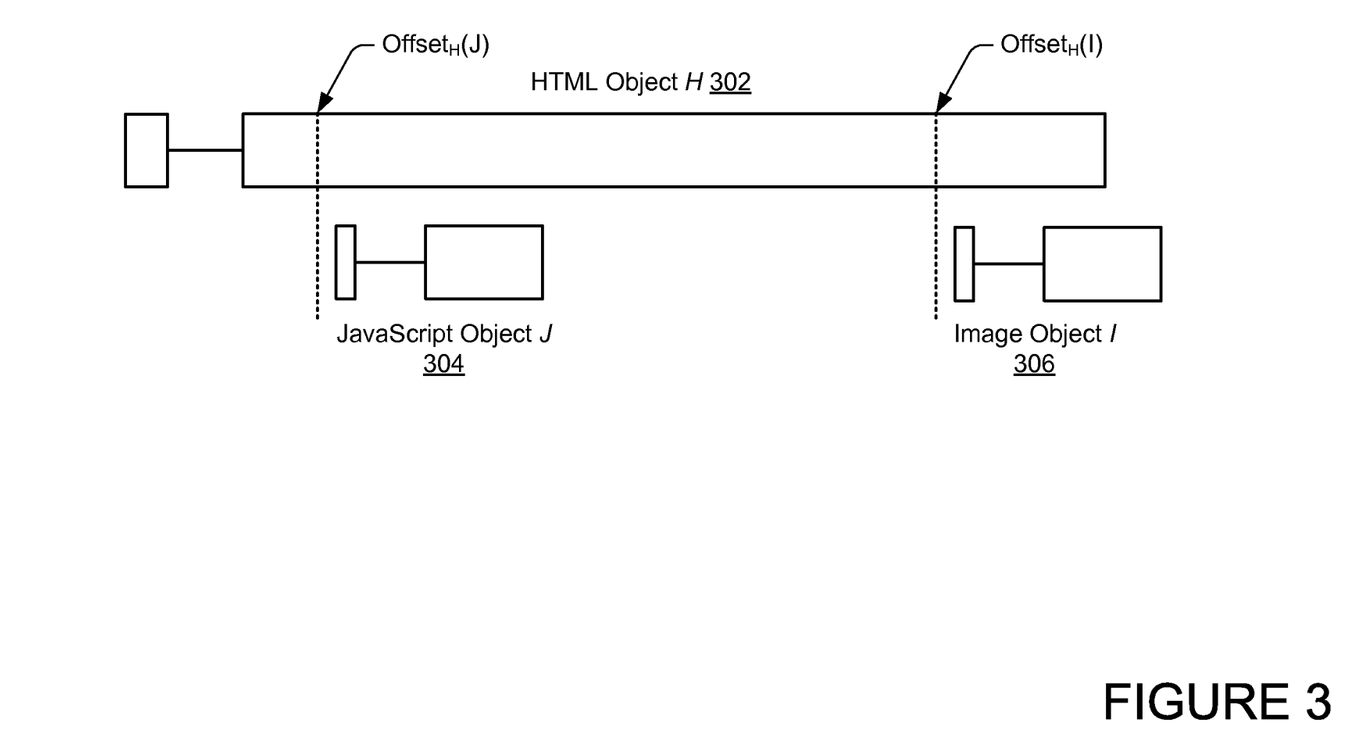
FIG. 3 is a block diagram that illustrates the extractions of stream parents and their dependency offsets for web objects, in accordance with various embodiments.

Furthermore, the dependency extractor 222 may also extract stream parents and their dependency offsets. The extractions of stream parents and their dependency offsets are illustrated in FIG. 3. As shown in FIG. 3, a HTML stream object H 302 may contain a JavaScript J 304 and an image object I 306. JavaScript J 304 and image object I 306 may be embedded in the beginning and the end of stream object H 302 respectively (offset$_H$ (J)<offset$_H$ (I)). However, because the URL of image object I 306 is defined in JavaScript J 304, image object I 306 cannot be downloaded until JavaScript J is executed. This causes the image object I 306 to depend on both the stream object H 302 and the JavaScript J 304 while the JavaScript J 304 only depend on the stream object H 302.

In a normal scenario, the stream object H 302 cannot be the parent of the image object I 306 since the JavaScript object J 304 is the descendant of stream object H 302 and the ancestor of the image object I 306. Nonetheless, when the download of the stream object H 302 is slow, the JavaScript J 304 may be downloaded and executed before the offset HO becomes available. In such a case, the stream object H 302 may become the last parent of the image object I 306.

Thus, given the stream object H 302 and its descendant image object I 306, the dependency extractor 222 may determine whether the stream object H 302 is the parent of the image object I 306. In various embodiments, the dependency extractor 222 may first load an entire webpage and control the download of the stream object H 302 at an extremely low rate $\lambda$. If the stream object H 302 is the parent of the image object I 306, all of the other ancestors of the image object I 306 may be available by the time offset$_H$ (I) is available. The dependency extractor 222 may then estimate offset$_H$ (I) with offset$_H$ (I)', whereby the latter is the offset of stream object H 302 that has been downloaded when the request of the image object I starts to be sent out. In some embodiments, offset$_H$ (I)' may be directly inferred from network traces and is usually larger than offset$_H$ (I). This is because it may take some extra time to request image object I after offset$_H$ (I) is available. However, since stream object H 302 is downloaded at an extremely low rate, these two offsets should be very close.

Having inferred offset$_H$ (I)', the dependency extractor 222 may perform an additional parental test to determine whether stream object H 302 is the parent of image object I 306. During the testing process, the dependency extractor 222 may reload the entire webpage. However, for this reload, the dependency extractor 222 may control the download of stream object H 302 at the same low rate $\lambda$ as well as delay the download of all the known non-stream parents of image object I 306 by $\tau$. Further, assuming offset$_H$ (I)" is the offset of stream object H 302 that was downloaded when the request of image object I 306 is sent out during the reload, if offset$_H$ (I)"−offset$_H$ (I)'<<$\tau$×$\lambda$ is true, then the delay of I's known parents has little effect on when image object I 306 is requested. Accordingly, stream object H 302 may be designated as the last parent of image object I 306. In this way, the parental relationship between the stream objects in the webpage, as well as their dependency offsets, may be further encapsulated by the PDG 112 (FIG. 1).

The choice of $\lambda$ may reflect a tradeoff between measurement accuracy and efficiency. A small $\lambda$ may enable the dependency extractor 222 to estimate offset$_H$ (I) more accurately but may also lead to a relatively long processing time, as the parameter $\tau$ may directly affect the accuracy of the parental tests. For example, if $\tau$ is too small, the results may be susceptible to noise, increasing the chance of missing the true stream parents. However, if $\tau$ is too large, the dependency extractor 222 may mistakenly infer a parent relationship because offset$_H$ (I)"−offset$_H$ (I)' is bound by size$_H$−offset$_H$ (I) where size$_H$ is the page size of stream object H 302. In at least one embodiment, the dependency extractor 222 may use $\lambda$=size$_H$/200 bytes/sec and $\tau$=2 seconds. This means the stream object H takes 200 seconds to transfer. However, additional embodiments may use other values for $\lambda$ and $\tau$ provided they supply adequate tradeoffs between measurement accuracy and efficiency.

Performance Predictor

The performance predictor 228 may predict the performance of cloud services under hypothetical scenarios. Given the page load time (PLT) of a baseline scenario, the performance predictor 228 may predict the new PLT when there are changes to a plurality of parameters. In various embodiments, the changes to the parameters may include changes in the client delay, the server delay, the network delay (e.g., DNS lookup time, TCP handshake time, or data transfer time), and/or the RTT. Thus, the performance predictor 228 may help service providers identify performance bottlenecks and devise effective optimization strategies. In other words, the performance predictor 228 may simulate page loading processes of a browser under a wide range of hypothetical scenarios.

During the operation of the performance predictor 228, the performance predictor 228 may first infer the timing information of each web object from the network trace of a webpage load in a baseline scenario. In various embodiments, the performance predictor 228 may first obtain the timing information from the measurement engine 206. Second, based on the parental dependency graph (PDG) of the webpage, the performance predictor 228 may further annotate each web object with additional information related to client delay. Third, the performance predictor 228 may adjust the web object timing information to reflect changes from the baseline scenario to the new one. Finally, the performance predictor 228 may simulate the page load process with new web object timing information to estimate the new page load PLT. Except for the factors adjusted, the page load process of the new scenario may inherit properties from the baseline scenario, including non-deterministic factors, such as whether a domain name is cached by the browser.

Performance Predictor—Obtain Timing Information

The performance predictor 228 may infer web objects and their timing information from network traces of a page load collected at the client, such as the client 108 (FIG. 1). In various embodiments, the performance predictor 228 may include a trace analyzer 230 that recovers DNS, TCP and HTTP object information. For HTTP protocol, the performance predictor 228 may use TCP reassembly and HTTP protocol parsing to recover the HTTP object information. For DNS protocol, the trace analyzer 230 may use a DNS parser to recover the domain name related to the DNS requests and responses. In at least one embodiment, the performance predictor 228 may leverage a network intrusion detection tool component to recover the timing and semantic information from the raw packet trace.

The trace analyzer 230 may estimate the RTT of each connection by the time between SYN and SYN/ACK packets. Based on the TCP self-clocking behavior, the trace analyzer 230 may estimate the number of round trips of the HTTP transfer taken by a web object. The packets in one TCP sending window are relatively close to each other (e.g., less than one RTT), but the packets in different sending windows are about one RTT apart (approximately 1±0.25 RTT). This approach may help the trace analyzer 230 to identify the additional delay added by the web servers, which is usually quite different from one RTT.

Thus, the performance predictor 228 may be client-deployable since it does not require any application-level instrumentations. By using the trace analyzer 230, the performance predictor 228 may identify object timing information 232 for each web object. The timing information 232 may include information for three types of activity: (1) DNS lookup time: the time used for looking up a domain name; (2) TCP connection time: the time used for establishing a TCP connection; and (3) HTTP time: the time used to load a web object.

Moreover, HTTP time may be further decomposed into three parts: (i) request transfer time: the time to transfer the first byte to the last byte of the HTTP request; (ii) response time: the time from when the last byte of the HTTP request is sent to when the first byte of the HTTP reply is received, which may include one RTT plus server delay; and (iii) reply transfer time: the time to transfer the first byte to the last byte of an HTTP reply.

In addition, the performance predictor 228 may infer the RTT for each TCP connection. The RTT of a TCP connection may be quite stable since the entire page load process usually lasts for only a few seconds. The performance predictor 228 may also infer the number of round-trips involved in transferring an HTTP request or reply. Such information may enable the performance predictor 228 to predict transfer times when RTT changes.

Performance Predictor—Additional Client Delay Information

As stated above, the performance predictor 228 may further annotate each object with additional timing information related to client delay. In various embodiments, the timing information 232 may be supplemented with the additional timing information related to client delay. For example, when the last parent of a web object X becomes available, the browser may not issue a request for the web object X immediately. This is because the browser may need time to perform some additional processing, e.g., parsing HTML pages or executing JavaScripts. For the web object X, the performance predictor 228 may use client delay to denote the time from when its last parent is available to when browser starts to request the web object X.

When the browser loads a sophisticated webpage or the client machine is slow, client delay may have significant impact on PLT. Accordingly, the performance predictor 228 may infer client delay of each web object by combining the obtained object timing information of each web object with the PDG (e.g., PDG 112) of the webpage. It will be appreciated that when a browser starts to request a web object, the first activity may be DNS, TCP connection, or HTTP, depending on the current state and behavior of the browser.

Many browsers may limit the maximum number of TCP connections to a host server. For example, some browsers (e.g., Internet Explorer® 7) may limit the number of TCP connections to six by default. Such limitations may cause the request for a web object to wait for available connections even when the request is ready to be sent. Therefore, the client delay that the performance predictor 228 observes in a trace may be longer than the actual browser processing time. To overcome this problem, when collecting the packet traces in the baseline scenario for the purpose of prediction, the performance predictor 228 may set the connection limit per host of the browser to a large number, for instance, 30. This may help to reduce the effects of connection waiting time.

Performance Predictor—Adjust Object Timing Information

Further, having obtained the web object timing information 232 under the baseline scenario, the performance predictor 228 may adjust the timing information 232 for each web object according to a new scenario. In other words, the timing information 232 may be adjusted with new input parameters 122 (FIG. 1) that modify one or more of the server delay, the client delay, the network delay, the RTT time, etc. The new input parameters 122 (FIG. 1) may be inputted by a user or a testing application. The modifications may increase or decrease the value of each delay or time.

In at least one embodiment, assuming $server_\delta$ is the server delay difference between the new and the baseline scenario, the performance predictor 228 may add the input $server_\delta$ to the response time of each web object to reflect the server delay change in the new scenario. The performance predictor 228 may use similar methods to adjust DNS activity and client delay for each web object with the new scenario inputs 236.

The performance predictor 228 may also adjust for RTT changes. Assuming the HTTP request and response transfers involve m and n round-trips for the web object X, the performance predictor 228 may add $(m+n+1) \times rtt_\delta$ to the HTTP activity of the web object X, and $rtt_\delta$ to the TCP connection activity if a new TCP connection is required for loading the web object X. In such embodiments, the performance predictor 228 may operate under the assumption that RTT change has little impact on the number of round-trips involved in loading a web object.

Performance Predictor—Simulating Page Load

The performance predictor 228 may further predict page load time (PLT) based on the web object timing information 232 by simulating a page load process. Since web object downloads are not independent of each other, the download of a web object may be blocked because its dependent objects are unavailable or because there are no TCP connections ready for use. Accordingly, the performance predictor 228 may account for these limitations when simulating the page load process by taking into accounts the constraints of a browser and the corresponding PDG (e.g., PDG 112) of the webpage.

For example, web browsers such as Internet Explorer® and Firefox®, as produced by the Mozilla Corporation of Mountain View, Calif., may share some common constraints and features. Presently, Internet Explorer® and Firefox® both use HTTP/1.1 with HTTP pipelining disabled by default. This may be due to the fact that HTTP pipelining may perform badly with the presence of dynamic content, e.g., one slow request may block other requests. However, without pipelining, HTTP request-reply pairs do not overlap with each other within the same TCP connection. However, in HTTP/1.1, a browser may use persistent TCP connections that can be reused for multiple HTTP requests and replies. The browser may attempt to keep the number of parallel connections small. Accordingly, the browser may open a new connection only when it needs to send a request and all existing connections are occupied by other requests or replies. The browser may be further configured with an internal parameter to limit the maximum number of parallel connections with a particular host. Such limit may be commonly applied to a host instead of to an IP address. However, if multiple hosts map to the same IP address, the number of parallel connections with that IP address may exceed the limit. Thus, during the page load simulation, the performance predictor 228 may set the number of possible parallel connections according to the connection limitations of a particular browser. However, in other embodiments, the number of possible parallel connections may be modified (e.g., increased or decreased). Thus, the new input parameters 122 (FIG. 1) of a new scenario may further include the number of possible parallel connections.

Moreover, the web browsers, such as Internet Explorer® and Firefox®, may also share some common features. For example, loading a web object in a web browser may trigger multiple activities including looking up a DNS name, establishing a new TCP connection, waiting for an existing TCP connection, and/or issuing an HTTP request. Five possible combinations of these activities are illustrated below in Table I. A "–" in Table I means that the corresponding condition does not matter for the purpose of predicting page load time (PLT). The activities involved in each case are further illustrated in FIG. 4.

TABLE I

Connection Packing Possibilities for a Given Domain Name

Figure 4:
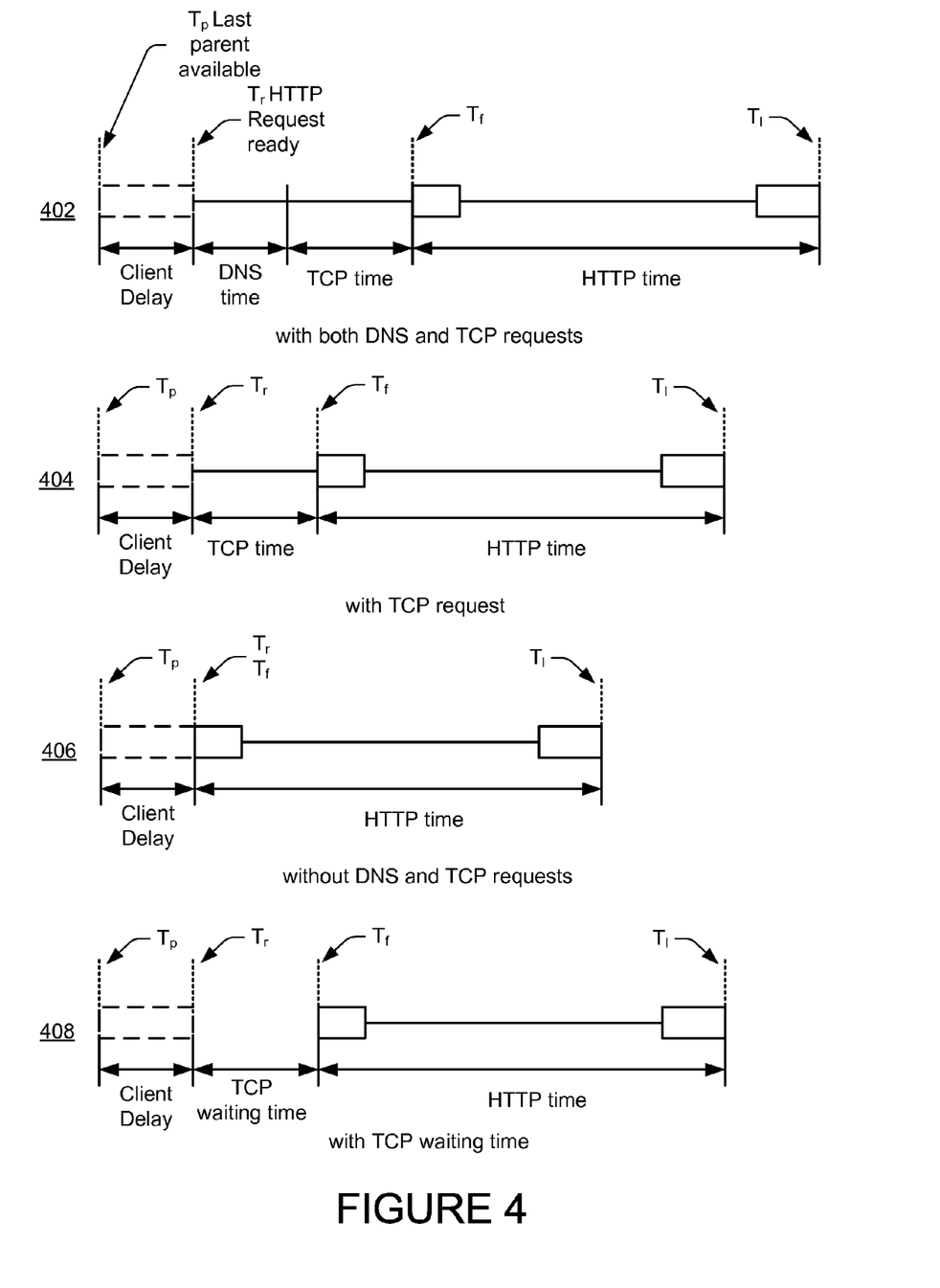
FIGS. 4 shows block diagrams that illustrate four scenarios of object timing relationship for a single HTTP object, in accordance with various embodiments.

| | Case | | | | |
|---|---|---|---|---|---|
| | I | II | III | IV | V |
| First Web Object of a Domain | Yes | Yes | No | No | No |
| Cached DNS Name | No | Yes | — | — | — |
| Available TCP Connections | — | — | Yes | No | No |
| Maximum Number of Parallel Connections | — | — | — | No | Yes |
| Corresponding Scenario in FIG. 4 | 402 | 404 | 406 | 404 | 408 |

FIG. 4 shows block diagrams that illustrate scenarios 402-408 of web object timing relationship for a single HTTP object, in accordance with various embodiments. For instance, in Case V, a browser may load a web object from a domain with which it already has established TCP connections. However, because all the existing TCP connections are occupied and the number of parallel connections has reached a maximum limit, the browser may have to wait for the availability of an existing connection to issue the new HTTP request. Case V is illustrated as scenario 408 of FIG. 4.

Based on the common limitations and features of web browsers, the performance predictor 228 may estimate a new PLT of a webpage by using prediction engine 234 to simulate the corresponding page load process. In various embodiments, the prediction engine 234 may use an algorithm that takes the adjusted timing information of each web object in the web page, as well as the parental dependency graph (PDG) of the webpage as inputs, and simulate the page loading process for the webpage to determine a new page load time (PLT). The algorithm may be expressed in pseudo code ("PredictPLT") as follows:

```
PredictPLT(ObjectTimingInfo, PDG)
Insert root objects into CandidateQ
While (CandidateQ not empty)
    1) Get earliest candidate C from CandidateQ
    2) Load C according to conditions in Table 1
    3) Find new candidates whose parents are available
    4) Adjust timings of new candidates
    5) Insert new candidates into CandidateQ
Endwhile
```

In other words, the PLT may be estimated by the algorithm as the time when all the web objects are loaded. For each web object X, the algorithm may keep track of four time variables: (1) $T_p$: when the web object X's last parent is available; (2) $T_r$: when the HTTP request for the web object X is ready to be sent; (3) $T_f$: when the first byte of the HTTP request is sent; and (4) $T_l$: when the last byte of the HTTP reply is received. As stated above, FIG. 4 illustrates the position of these time variables in four different scenarios. In addition, the algorithm may maintain a priority queue CandidateQ that contains the web objects that can be requested. The objects in CandidateQ may be sorted based on $T_r$.

Initially, the algorithm may insert the root objects of the corresponding PDG of the webpage into the queue CandidateQ with their $T_r$ set to 0. A webpage may have one main HTML object that serves as the root of the PDG. However, in some scenarios, multiple root objects may exist due to asynchronous JavaScript and Extensible Markup Language (XML) downloading, such as via AJAX. In each Iteration, the algorithm may perform the following tasks: (1) obtain object C with smallest $T_r$, from CandidateQ; (2) load object C according to the conditions listed in Table 1; (2) update $T_f$ and $T_l$ based on whether the loading involves looking up DNS names, opening new TCP connections, waiting for existing connections, and/or issuing HTTP requests. $T_f$ and $T_l$ may be used to determine when a TCP connection is occupied by the object C; (3) after the object C is loaded, find all the new candidates whose last parent is the object C; (4) adjust the $T_p$ and $T_r$ of each new candidate X If the object C is a non-stream object, $T_p$ of the object X may be set to $T_l$ of the object C. However, if object C is a stream object, $T_p$ of the object X may be set to the available-time of offset$_C$ (X), and $T_r$ of the object X may be set to $T_p$, plus the client delay of the object X; and (5) insert new candidates into CandidateQ.

With the use of such an algorithm and the prediction engine 234, the performance predictor 228 may simulate a page load process for the webpage based on the adjusted web object timing information 232, in which the adjusted web object timing information 232 includes the new modified input parameters 122 (FIG. 1). The simulation of the page load process may generate a new predicted PLT for the webpage. In various embodiments, the performance predictor 228 may output the predicted PLT as the result 236.

The data storage module 238 may be configured to store data in a portion of memory 204 (e.g., a database). In various embodiments, the data storage module 238 may store web pages for analysis, algorithms used by the dependency extractor 222 and the prediction engine 234, the extracted PDGs, and timing information of the web objects (e.g., the client delay, the network delay, and the server delay). The data storage module 238 may further store parameter settings for different page loading scenarios, and/or results such as the PLTs of web pages under different scenarios. The data storage module 238 may also store any additional data derived during the automated performance of cloud services, such as, but not limited, trace information produced by the trace analyzer 230.

The comparison engine 240 may compare the new predicted PLT (e.g., result 236) of each webpage with the original PLT of each webpage, as measured by the measurement engine 206. Additionally, in some embodiments, the results 236 may also include one or more of the server delay, the client delay, the network delay, the RTT, etc., as obtained during the simulated page loading of the webpage by the performance predictor 228. Accordingly, the comparison engine 240 may also compare such values to one or more corresponding values obtained by the measurement engine 206 during the original page load of the webpage. Further, the comparison engine 240 may also compare a plurality of predicted PLTs of each webpage, as derived from different sets of input parameters, so that one or more improved sets of input parameters may be identified.

The user interface module 242 may interact with a user via a user interface (not shown). The user interface may include a data output device such as a display, and one or more data input devices. The data input devices may include, but are not limited to, combinations of one or more of keypads, keyboards, mouse devices, touch screens, microphones, speech recognition packages, and any other suitable devices or other electronic/software selection methods. The user interface module 242 may enable a user to input or modify parameter settings for different page loading scenarios, as well as select web pages and page loading processes for analysis. Additionally, the user interface module 242 may further cause the display to output representation of the PDGs of selected web pages, current parameter settings, timing information of the web objects, PLTs of web pages under different scenarios, and/or other pertinent data.

Example Processes

Figure 5:
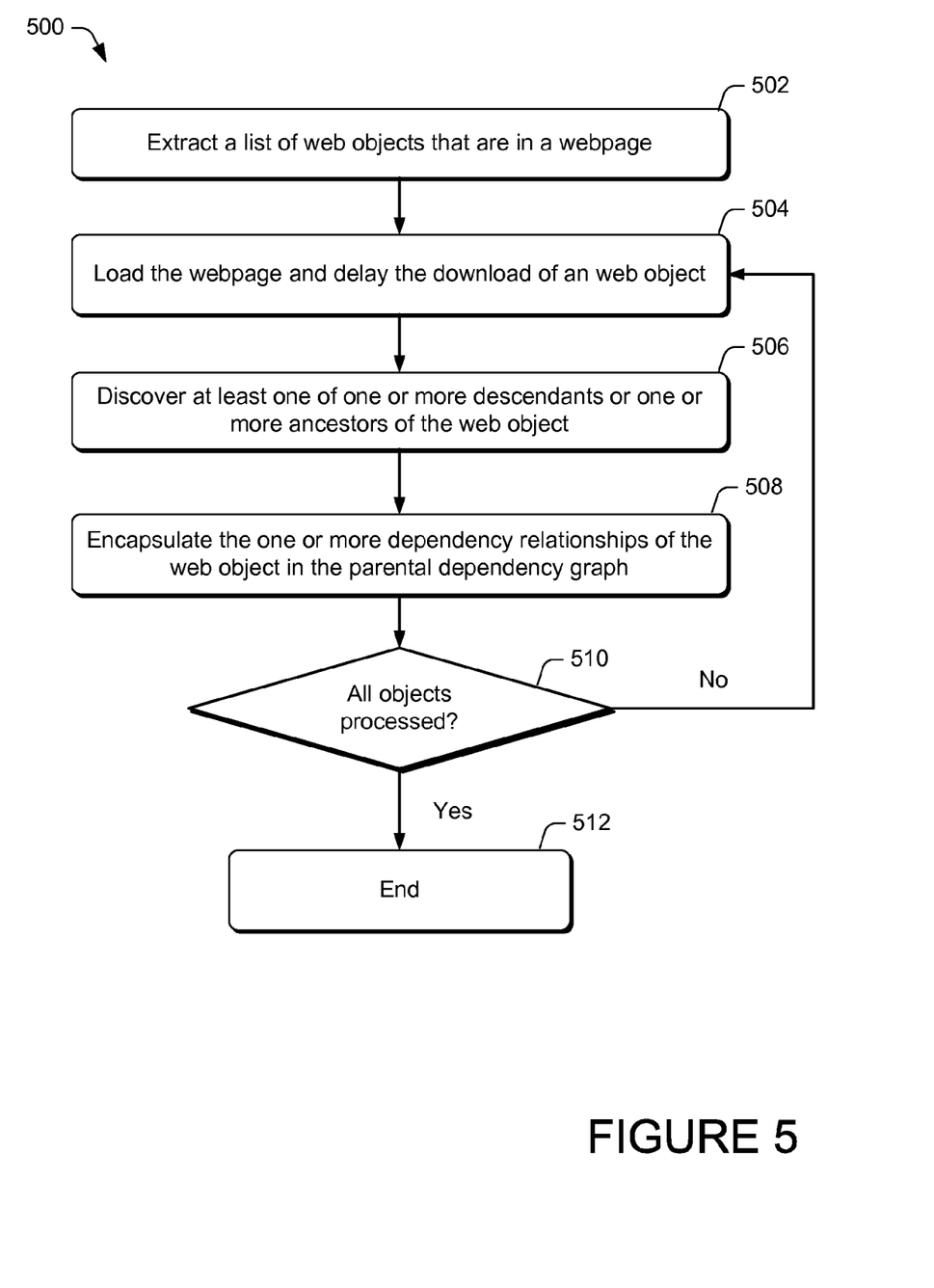
FIG. 5 is a flow diagram that illustrates an example process to extract a parental dependency graph (PDG) for a webpage, in accordance with various embodiments.
Figure 6:
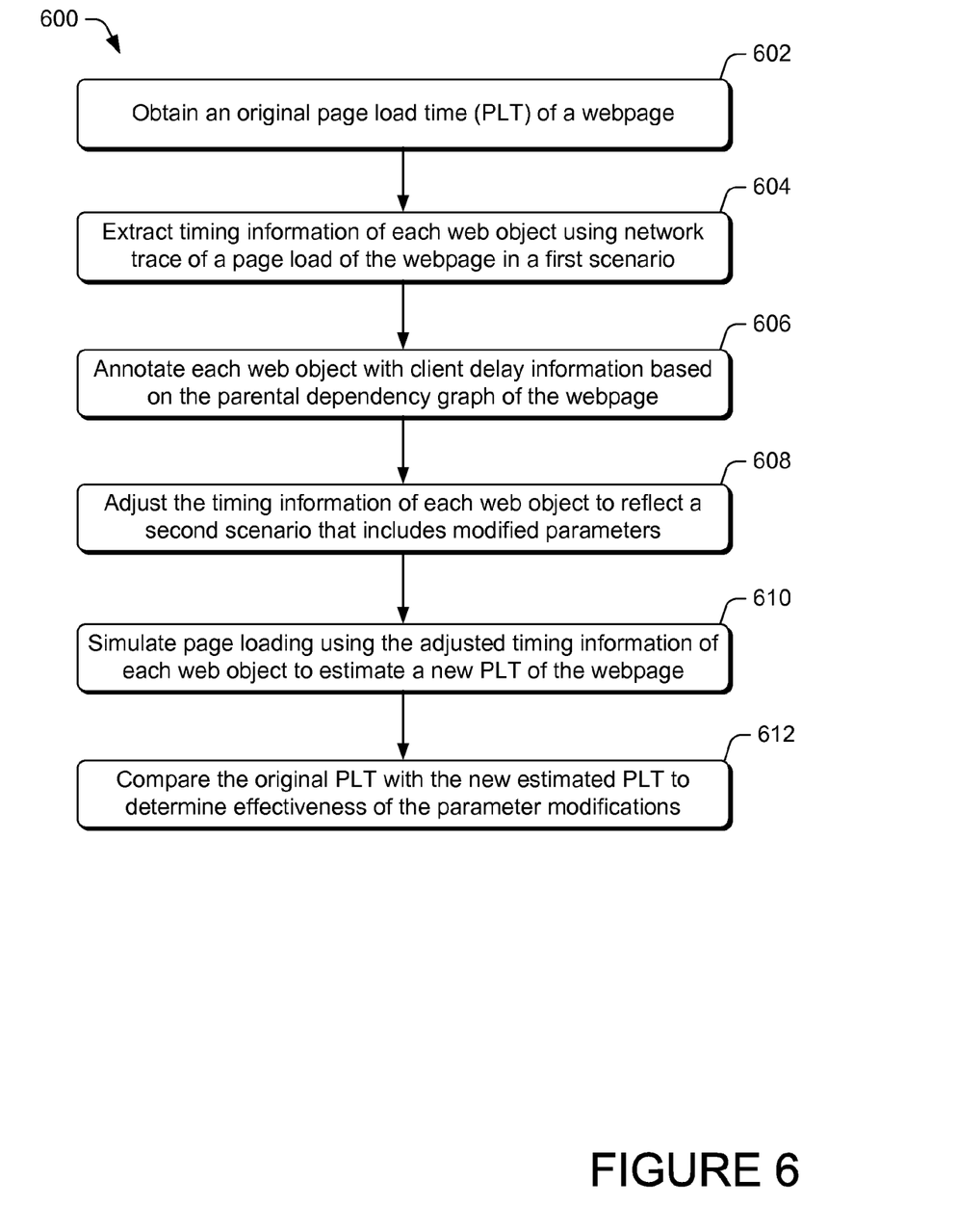
FIG. 6 is a flow diagram that illustrates an example process to derive and compare a new page load time (PLT) of a webpage with an original PLT of the web page, in accordance with various embodiments.

FIGS. 5-6 describe various example processes for automated cloud service performance prediction. The order in which the operations are described in each example process is not intended to be construed as a limitation, and any number of the described blocks can be combined in any order and/or in parallel to implement each process. Moreover, the blocks in the FIGS. 5-6 may be operations that can be implemented in hardware, software, and a combination thereof. In the context of software, the blocks represent computer-executable instructions that, when executed by one or more processors, cause one or more processors to perform the recited operations. Generally, computer-executable instructions include routines, programs, objects, components, data structures, and the like that cause the particular functions to be performed or particular abstract data types to be implemented.

FIG. 5 is a flow diagram that illustrates an example process 500 to extract a parental dependency graph (PDG) for a webpage, in accordance with various embodiments.

At block 502, the dependency extractor 222 of the cloud service analyzer 206 may extract a list of web objects in a webpage. In various embodiments, the dependency extractor 222 may use a web proxy 224 to delay web object downloads of a webpage and extract the list of web objects in the webpage by obtaining their corresponding Universal Resource Identifiers (URIs).

At block 504, the dependency extractor 222 may load the webpage and delay the download of a web object so that one or more descendants and/or one or more ancestors thereof may be discovered. In various embodiments, the dependency extractor 222 may use a browser robot 226 to load the webpage.

At block 506, the dependency extractor 222 may use an iterative algorithm to discover all the descendants and the ancestors of the web object. In various embodiments, the algorithm may extract one or more stream parent objects and/or one or more non-stream parent objects, one or more descendant objects, as well as the dependency relationships between the web object and the other web objects.

At block 508, the dependency extractor 222 may encapsulate the one or more dependency relationships of the web object that is currently being processed in a PDG, such as the PDG 112 (FIG. 1).

At decision block 510, the dependency extractor 222 may determine whether all the web objects of the webpage have been processed. In various embodiments, the dependency extractor 222 may make this determination based on the list of the web objects in the webpage. If the dependency extractor 222 determines that not all of the web objects in the webpage has been processed ("no" at decision block 510), the process 500 may loop back to block 504, where another web object in the list of web objects may be processed for descendants and ancestor web objects. However, if the dependency extractor 222 determines all web objects have been processed ("yes" at decision block 510), the process may terminate at block 512.

FIG. 6 is a flow diagram that illustrates an example process 600 to derive and compare a new page load time (PLT) of a webpage with an original PLT of the web page, in accordance with various embodiments.

At block 602, the performance predictor 228 of the cloud service analyzer 206 may obtain an original PLT (e.g., PLT 114) of a webpage. In various embodiments, the performance predictor 228 may obtain the PLT of the webpage from the measurement engine 206.

At block 604, the performance predictor 228 may extract timing information (e.g., timing information 232) of each web object using a network trace. The network trace may be implemented on a page load of the webpage under a first scenario. In various embodiments, the performance predictor 228 may use trace logger 220 of the measurement engine 206 to perform the network tracing. The first scenario may include a set of default parameters that represent client delay, the network delay (e.g., DNS lookup time, TCP handshake time, or data transfer time), the server delay, and/or the RTT experienced during the page load.

At block 606, the performance predictor 228 may annotate each web object with additional client delay information based on the parental dependency graph (PDG) of the webpage. In various embodiments, the additional client delay information may represent the time a browser needs to do some additional processing, e.g., parsing HTML pages or executing JavaScripts, the time expended due to browser limitation on the maximum number of simultaneous TCP connections.

At block 608, the performance predictor 228 may adjust the web object timing information of each web object to reflect a second scenario that includes one or more modified parameters (e.g., modified parameters 122). In various embodiments, the modified parameters may have been modified based on input from a user or a testing application. For example, but not as a limitation, the cloud service analyzer 110 (FIG. 1) may receive one or more modifications to RTT, modifications to network processing delay (e.g., modifications to DNS lookup time, TCP handshake time, or data transfer time), modifications to client processing delay, modifications to server processing delay, and/or the like. The modifications may increase or decrease the value of each delay or time.

At block 610, the performance predictor 228 may simulate page loading of the webpage to estimate a new PLT (e.g., PLT 124) of the webpage. In various embodiments, the performance engine may use the prediction engine 234 to simulate the page loading of each web object of the webpage based on the adjusted time information that includes the modified parameters (e.g., modified parameters 122) and the PDG (e.g., PDG 112).

At block 612, the comparison engine 240 of the cloud service analyzer 206 may compare the new PLT of the webpage to the original PLT of the webpage to determine whether the load time has been improved via the parameter modifications (e.g., whether a shorter or improved PLT is achieved, or whether the parameter modifications actually increased the PLT). In further embodiments, the comparison engine 240 may also compare a plurality of new PLTs that are derived based on different modified timing information so that improved parameters may be determined.

Example Computing Device

Figure 7:
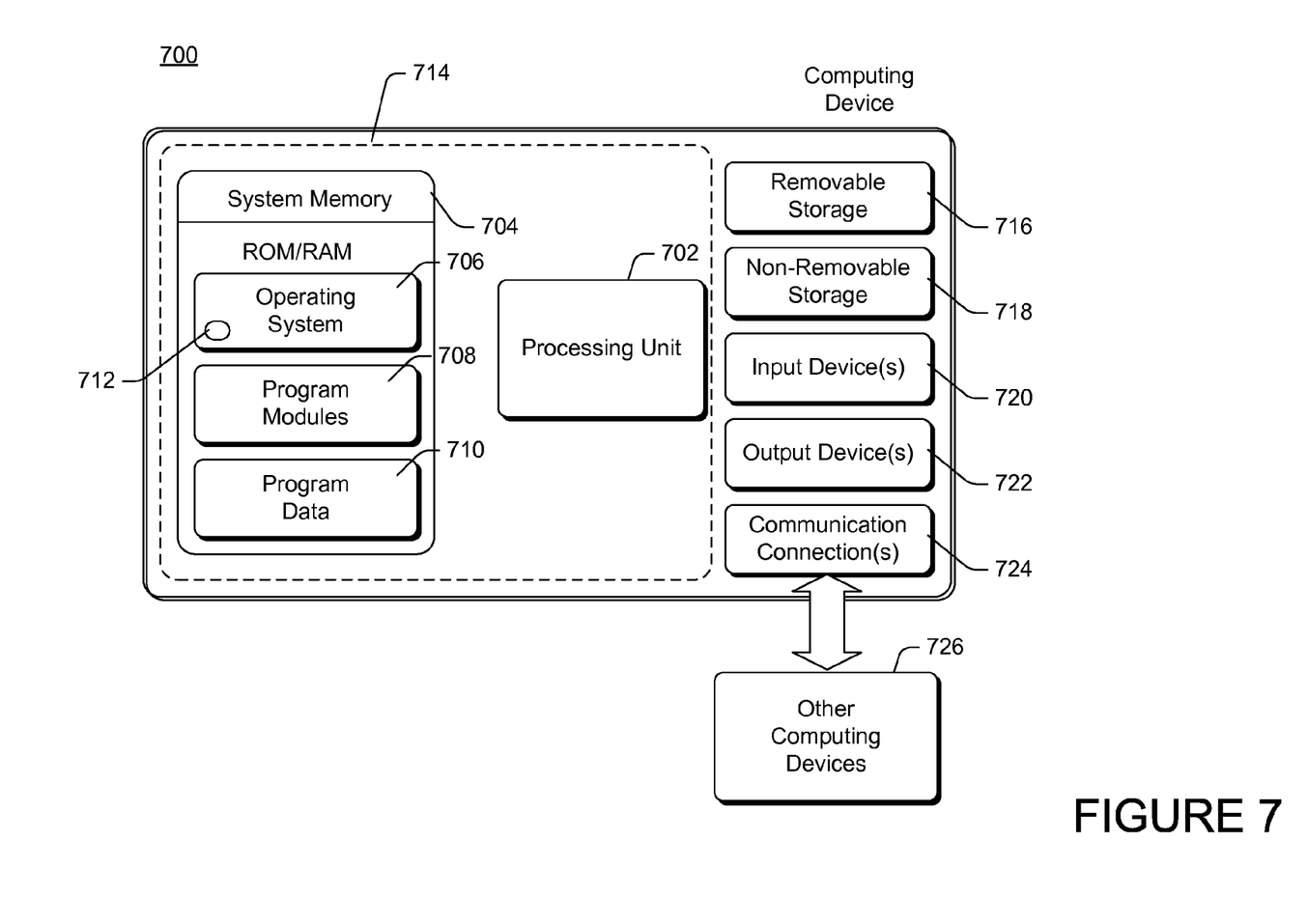
FIG. 7 is a block diagram that illustrates a representative computing device that may implement automated performance prediction for cloud services.

FIG. 7 illustrates a representative computing device 700 that may implement automated performance prediction for cloud services. For example, the computing device 700 may be a server, such as one of the servers 102(1)-102(n), as described in FIG. 1. Moreover, the computing device 700 may also act as the client device 108 described in the discussion accompanying FIG. 1. However, it will be readily appreciated that the techniques and mechanisms may be implemented in other computing devices, systems, and environments. The computing device 700 shown in FIG. 7 is only one example of a computing device and is not intended to suggest any limitation as to the scope of use or functionality of the computer and network architectures.

In at least one configuration, computing device 700 typically includes at least one processing unit 702 and system memory 704. Depending on the exact configuration and type of computing device, system memory 704 may be volatile (such as RAM), non-volatile (such as ROM, flash memory, etc.) or some combination thereof. System memory 704 may include an operating system 706, one or more program modules 708, and may include program data 710. The operating system 706 includes a component-based framework 712 that supports components (including properties and events), objects, inheritance, polymorphism, reflection, and provides an object-oriented component-based application programming interface (API), such as, but by no means limited to, that of the .NET™ Framework manufactured by the Microsoft® Corporation, Redmond, Wash. The computing device 700 is of a very basic configuration demarcated by a dashed line 714. Again, a terminal may have fewer components but may interact with a computing device that may have such a basic configuration.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by removable storage 716 and non-removable storage 718. Computer storage media may include volatile and nonvolatile, removable and non-removable media implemented in any method or technology for storage of information, such as computer readable instructions, data structures, program modules, or other data. System memory 704, removable storage 716 and non-removable storage 718 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by Computing device 700. Any such computer storage media may be part of device 700. Computing device 700 may also have input device(s) 720 such as keyboard, mouse, pen, voice input device, touch input device, etc. Output device(s) 722 such as a display, speakers, printer, etc. may also be included.

Computing device 700 may also contain communication connections 724 that allow the device to communicate with other computing devices 726, such as over a network. These networks may include wired networks as well as wireless networks. Communication connections 724 are some examples of communication media. Communication media may typically be embodied by computer readable instructions, data structures, program modules, etc.

It is appreciated that the illustrated computing device 700 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

The implementation of automated performance prediction for cloud services on a client device may enable the assessment of cloud service performance variation in response to a wide range of hypothetical scenarios. Thus, the techniques described herein may enable the prediction of parameter settings that provide optimal cloud service performance, i.e., shortest page load time (PLT) without error prone and/or time consuming manual trial-and-error parameter modifications and performance assessments. Moreover, the implementation of automated performance prediction for cloud services on a client device may take into account factors that are not visible to cloud service providers. These factors may include page rendering time, object dependencies, multiple data sources across data centers and data providers.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:
1. A system, comprising:
one or more processors;
a memory that includes a plurality of computer-executable components, the plurality of computer-executable components comprising:
a dependency extractor that extracts one or more dependency relationships for each web object in a webpage, each dependency relationship being a relationship between a corresponding web object and an associated descendant web object or an associated ancestor web object, wherein the dependency extractor discovers a dependency relationship between a first web object of the webpage and a second object of the webpage based at least on a delay in downloading of the first web object causing a delay in downloading of the second web object;
a performance predictor that ascertains an original performance metric value associated with a page loading of the webpage, and simulates an additional page loading of the webpage based on adjusted timing information and dependency relationships between web objects in the webpage to estimate a new performance metric value associated with the additional page loading, wherein the adjusted timing information includes at least one of a modified client delay associated with at least one of page rendering or JavaScript execution of the webpage or a modified server delay associated with at least one of retrieving static content or generating dynamic content of the webpage;
a comparison engine that determines that the new performance metric value is less than the original performance metric value; and
a web browser that executes, based at least in part on the adjusted timing information, a subsequent page loading of the webpage in response to determining that the new performance metric value is less than the original performance metric value.

2. The system of claim 1, wherein the adjusted timing information differs from original timing information associated with the page loading of the webpage.

3. The system of claim 2, further comprising a measurement engine that records the original timing information associated with the page loading of the webpage.

4. The system of claim 2, wherein the original timing information includes at least one of a client delay associated with the at least one of page rendering or JavaScript execution of the webpage or a server delay associated with the at least one of retrieving static content or generating dynamic content of the webpage.

5. The system of claim 1, wherein the adjusted timing information further comprises a modified network delay due to at least one of a modified domain name system (DNS) lookup time, a modified transmission control protocol (TCP) handshake time, or a modified data transfer time associated with loading the web object of the webpage.

6. The system of claim 1, wherein the dependency extractor encapsulates the dependency relationships between the web objects in the webpage in a parental dependency graph (PDG).

7. The system of claim 1, wherein the original performance metric value includes an original page load time for the webpage, and the new performance metric value includes a new page load time for the webpage.

8. The system of claim 1, wherein the webpage includes at least one of a JavaScript object or a cascading style sheet (CSS) object.

9. The system of claim 1, wherein the performance predictor initially infers, as a baseline, timing information from a network trace of the webpage.

10. A system comprising:
one or more processors;
memory storing computer-executable instructions that, when executed by the one or more processors, perform acts comprising:
extracting one or more dependency relationships for each web object in a webpage, each dependency relationship being a relationship between a corresponding web object and an associated descendant web object or an associated ancestor web object, wherein at least one dependency relationship between a first web object of the webpage and a second web object of the webpage is based at least on a delay in downloading of the first web object causing a delay in downloading of the second web object;
ascertaining an original performance metric value associated with a page loading of the webpage;
modifying original timing information associated with the page loading of the webpage to obtain adjusted timing information, wherein the adjusted timing information includes at least one of a modified client delay associated with at least one of page rendering or JavaScript execution of the webpage or a modified server delay associated with at least one of retrieving static content or generating dynamic content of the webpage;
simulating an additional page loading of the webpage based on the adjusted timing information and dependency relationships between the web objects in the webpage to estimate a new performance metric value associated with the additional page loading; and
implementing the adjusted timing information for executing a subsequent page loading of the webpage in response to determining that the new performance metric value is less than the original performance metric value.

11. The system of claim 10, wherein the original performance metric value includes an original page load time for the webpage, and the new performance metric value includes a new page load time for the webpage.

12. The system of claim 10, wherein the original timing information includes at least one of a client delay associated with the at least one of page rendering or JavaScript execution of the webpage or a server delay associated with the at least one of retrieving static content or generating dynamic content of the webpage.

13. The system of claim 10, wherein the extracting includes encapsulating the dependency relationships between the web objects in the webpage in a parental dependency graph (PDG).

14. The system of claim 10, wherein modifying the original timing information includes at least one of modifying a client delay associated with the at least one of page rendering or JavaScript execution of the webpage, modifying a server delay associated with the at least one of retrieving static content or generating dynamic content of the webpage.

15. The system of claim 14, wherein the acts further comprise modifying a network delay due to at least one of modifying a domain name system (DNS) lookup time, modifying a transmission control protocol (TCP) handshake time, or modifying a data transfer time associated with loading the web object of the webpage.

16. A computer-implemented method, comprising:
extracting one or more dependency relationships for each web object in a webpage, each dependency relationship being a relationship between a corresponding web object and an associated descendant web object or an associated ancestor web object, wherein at least one dependency relationship between a first web object of the webpage and a second web object of the webpage is based at least on a delay in downloading of the first web object causing a delay in downloading of the second web object;
ascertaining an original performance metric value associated with a page loading of the webpage;
modifying original timing information associated with the page loading of the webpage to obtain adjusted timing information, wherein the adjusted timing information includes at least one of a modified client delay associated with at least one of page rendering or JavaScript execution of the webpage or a modified server delay associated with at least one of retrieving static content or generating dynamic content of the webpage;
simulating an additional page loading of the webpage based on the adjusted timing information and dependency relationships between the web objects in the webpage to estimate a new performance metric value associated with the additional page loading;
determining that the new performance metric value is less than the original performance metric value; and executing, based at least in part on the adjusted timing information, a subsequent page loading of the webpage in response to determining that the new performance metric value is less than the original performance metric value.

17. The computer-implemented method of claim 16, wherein the extracting includes encapsulating the dependency relationships between the web objects in the webpage in a parental dependency graph (PDG), and wherein the original performance metric value include an original page load time for the webpage, and the new performance metric value includes a new page load time for the webpage.

18. The computer-implemented method of claim 16, further comprising initially inferring the original timing information from a network trace of the webpage.

19. The computer-implemented method of claim 16, wherein the adjusted timing information further comprises a modified network delay due to at least one of a modified domain name system (DNS) lookup time, a modified transmission control protocol (TCP) handshake time, or a modified data transfer time associated with loading the web object of the webpage.

\* \* \* \* \*